United States Patent
Finton et al.

(10) Patent No.: US 7,687,151 B2
(45) Date of Patent: Mar. 30, 2010

(54) OVERLAY FOR REPAIRING SPLINE AND SEAL TEETH OF A MATED COMPONENT

(75) Inventors: Troy Lance Finton, Burlingame, CA (US); Thomas Joseph Kelly, Cincinnati, OH (US); Kenneth Eric Lutz, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 1122 days.

(21) Appl. No.: 11/104,214

(22) Filed: Apr. 12, 2005

(65) Prior Publication Data

US 2006/0228573 A1 Oct. 12, 2006

(51) Int. Cl.
 *B23P 6/00* (2006.01)
(52) U.S. Cl. .................. 428/586; 428/603; 29/402.13
(58) Field of Classification Search .............. None
 See application file for complete search history.

(56) References Cited

U.S. PATENT DOCUMENTS

| | | | |
|---|---|---|---|
| 2,772,547 A * | 12/1956 | Nolan ..................... 464/162 |
| 3,166,018 A * | 1/1965 | Stedman, Jr. ............. 418/170 |
| 3,592,702 A | 7/1971 | Dehn |
| 3,668,768 A * | 6/1972 | De Core et al. ............. 72/362 |
| 3,854,984 A | 12/1974 | Schadler et al. |
| 3,975,064 A * | 8/1976 | Nilsson ..................... 384/43 |
| 4,059,884 A | 11/1977 | Weill |
| 4,122,240 A | 10/1978 | Banas et al. |
| 4,125,755 A | 11/1978 | Plamquist |
| 4,152,816 A | 5/1979 | Ewing et al. |
| 4,157,923 A | 6/1979 | Yen et al. |
| 4,263,496 A | 4/1981 | Medlar |
| 4,539,461 A | 9/1985 | Benedict et al. |
| 4,574,176 A | 3/1986 | Sharp |
| 4,657,171 A | 4/1987 | Robins |
| 4,735,071 A * | 4/1988 | Ueda et al. ..................... 72/65 |
| 4,807,351 A * | 2/1989 | Berg et al. ................... 29/432 |
| 4,814,236 A | 3/1989 | Qureshi et al. |
| 4,822,248 A | 4/1989 | Wertz et al. |
| 4,897,519 A | 1/1990 | Clark et al. |
| 4,994,646 A | 2/1991 | Tabata et al. |
| 5,024,582 A | 6/1991 | Bellows et al. |
| 5,048,183 A | 9/1991 | Cang et al. |
| 5,083,903 A | 1/1992 | Erdmann |
| 5,142,778 A | 9/1992 | Smolinski et al. |
| 5,185,924 A | 2/1993 | Fraser |
| 5,208,442 A | 5/1993 | Ahola et al. |
| 5,259,448 A * | 11/1993 | Masukawa et al. .......... 165/133 |
| 5,304,771 A | 4/1994 | Griffin et al. |

(Continued)

FOREIGN PATENT DOCUMENTS

EP 0 130 749 A1 1/1985

(Continued)

*Primary Examiner*—John J Zimmerman
(74) *Attorney, Agent, or Firm*—McNees Wallace & Nurick, LLC

(57) ABSTRACT

An overlay for repairing spline and seal teeth of a mated component is disclosed. The overlay is a tube constructed of a weld repair material, the tube having an outer surface and an inner surface. The inner surface is dimensioned to define an aperture sized to receive a plurality of radially spaced splines of the component, the splines of the component arranged to matingly engage a complementary component.

8 Claims, 7 Drawing Sheets

U.S. PATENT DOCUMENTS

| | | | |
|---|---|---|---|
| 5,416,299 | A | 5/1995 | Tabata et al. |
| 5,492,447 | A | 2/1996 | Mannava et al. |
| 5,532,495 | A | 7/1996 | Bloomquist et al. |
| 5,554,837 | A | 9/1996 | Goodwater et al. |
| 5,555,622 | A * | 9/1996 | Yamamoto et al. ..... 29/890.053 |
| 5,599,468 | A | 2/1997 | Mako et al. |
| 5,697,850 | A * | 12/1997 | Yaegashi et al. ............ 464/162 |
| 5,746,579 | A | 5/1998 | Amos et al. |
| 5,783,315 | A | 7/1998 | Schaeffer et al. |
| 5,794,338 | A | 8/1998 | Bowden, Jr. et al. |
| 5,822,838 | A | 10/1998 | Seal et al. |
| 5,831,241 | A | 11/1998 | Amos |
| 5,859,404 | A | 1/1999 | Wei et al. |
| 5,897,794 | A | 4/1999 | Hubbard et al. |
| 5,914,055 | A | 6/1999 | Roberts et al. |
| 5,919,094 | A * | 7/1999 | Yaegashi ................... 464/162 |
| 6,049,162 | A | 4/2000 | Schultheiss et al. |
| 6,116,658 | A * | 9/2000 | Bohlen ....................... 285/330 |
| 6,117,564 | A | 9/2000 | Crawmer et al. |
| 6,120,244 | A | 9/2000 | Fukura |
| 6,124,564 | A | 9/2000 | Sue et al. |
| 6,129,529 | A | 10/2000 | Young et al. |
| 6,156,994 | A | 12/2000 | Apunevich et al. |
| 6,177,647 | B1 | 1/2001 | Zapletal |
| 6,200,689 | B1 | 3/2001 | Ferrigno et al. |
| 6,241,616 | B1 * | 6/2001 | Lightcap ..................... 464/162 |
| 6,296,448 | B1 | 10/2001 | Suh et al. |
| RE37,562 | E | 2/2002 | Clark et al. |
| 6,364,971 | B1 | 4/2002 | Peterson, Jr. et al. |
| 6,365,281 | B1 | 4/2002 | Subramanian et al. |
| 6,376,801 | B1 | 4/2002 | Farrell et al. |
| 6,398,103 | B2 | 6/2002 | Hasz et al. |
| 6,453,557 | B1 | 9/2002 | Burdgick |
| 6,489,583 | B1 | 12/2002 | Feng et al. |
| 6,515,259 | B1 | 2/2003 | Hsu et al. |
| 2002/0023898 | A1 | 2/2002 | Brewer, Jr. et al. |
| 2003/0038123 | A1 | 2/2003 | Dykes et al. |
| 2003/0073502 | A1 | 4/2003 | Barnley et al. |
| 2003/0232652 | A1 | 12/2003 | Mahendru et al. |
| 2004/0034981 | A1 * | 2/2004 | Harms et al. ................ 29/421.1 |
| 2006/0120798 | A1 * | 6/2006 | Guarino .................... 403/359.5 |
| 2006/0225263 | A1 * | 10/2006 | Finton et al. .............. 29/402.13 |
| 2006/0228219 | A1 * | 10/2006 | Finton et al. ............. 416/244 A |

FOREIGN PATENT DOCUMENTS

| | | |
|---|---|---|
| EP | 0 143 450 A2 | 6/1985 |
| EP | 0 332 875 A2 | 9/1989 |
| EP | 0 345 434 A1 | 12/1989 |
| EP | 0 379 922 A1 | 8/1990 |
| EP | 0 461 589 A1 | 12/1991 |
| EP | 0 748 667 A1 | 12/1996 |
| EP | 0 780 187 A1 | 6/1997 |
| EP | 0 810 055 A1 | 12/1997 |
| EP | 0 993 898 A1 | 4/2000 |
| EP | 1 231 010 A1 | 8/2002 |
| GB | 2 361 493 A | 10/2001 |
| JP | 55-70469 | 5/1980 |
| JP | 57-99207 | 6/1982 |
| JP | 61-199588 | 9/1986 |
| JP | 3-94977 | 4/1991 |
| JP | 3-121717 | 5/1991 |
| JP | 4-191551 | 7/1992 |
| JP | 5-318153 | 12/1993 |
| JP | 5-318186 | 12/1993 |
| JP | 6-145943 | 5/1994 |
| JP | 7-185851 | 7/1995 |
| JP | 9-122958 | 5/1997 |
| JP | 10-180442 | 7/1998 |
| JP | 10-280907 | 10/1998 |
| JP | 11-336502 | 12/1999 |
| JP | 2001-47285 | 2/2001 |
| JP | 2002-28780 A | 1/2002 |
| JP | 2002-79373 | 3/2002 |
| JP | 2002-242696 | 8/2002 |
| SU | 722642 * | 3/1980 |
| SU | 1338946 * | 9/1987 |
| UA | 66399 C2 | 1/2002 |

* cited by examiner

OVERLAY FOR REPAIRING SPLINE AND SEAL TEETH OF A MATED COMPONENT

RELATED APPLICATIONS

This application is related to U.S. application Ser. No. 11/104,170 entitled "Method of Repairing Spline and Seal Teeth of a Mated Component" and to U.S. application Ser. No. 11/104,171 entitled "Repaired Spline and Seal Teeth on Mated Components" both of which are assigned to the Assignee of the present invention and which were also filed Apr. 12, 2005, the contents of which are hereby incorporated by reference in their entirety.

FIELD OF THE INVENTION

The present invention relates generally to repair of mated components. More particularly, this invention is directed to the repair of spline and seal teeth for an aircraft engine shaft.

BACKGROUND OF THE INVENTION

A gas turbine engine includes a compressor that provides pressurized air to a combustor wherein the air is mixed with fuel and burned for generating hot combustion gasses. These gasses flow downstream to one or more turbines that extract energy therefrom to power the compressor and provide thrust for powering an aircraft in flight. Typically, a hollow shaft is axially located within the gas turbine to connect the compressor and turbine for rotation therewith. The shaft may be interconnected to rotary components of the engine by a series of radially spaced spline teeth or "splines." The shaft is typically manufactured with a forging, machining and hardening process.

A gas turbine engine rotates in a single direction during operation and is a delicately balanced machine. As the engine is operated normally, the splines on the shaft transmit loads and experience wear, generally on a single face. Typically, a spline is a thin member that interfaces with a mating spline on an adjacent part. The face of each spline that transmits the torque from the turbine to the compressor typically wears in a predictable pattern. This wear on the load transmitting, or pressure, face of the splines can cause loss of material stock, the creation of a stress riser on the pressure face and reduction of service life of the part, eventually necessitating an engine rebuild. Excessive spline wear could result in failure of both the splines and the engine.

During an engine rebuild, the shaft is inspected to determine the amount of wear on various contacting surfaces, including the spline and seal teeth. The shaft dimensions are compared to a predetermined set of dimensions and tolerances. A shaft that is not within acceptable tolerances of the predetermined dimensions is typically scrapped and a new shaft is inserted into the rebuilt engine. One reason for scrapping the shaft is the lack of adequate repair methods for the worn spline teeth. Typically, the wear experienced by the splines is only a few thousandths of an inch on the pressure face of the splines, with negligible wear on the opposite faces and tops of the splines.

Efforts to repair the worn face of shaft splines by welding a filler material to the worn face and remachine this face have resulted in a repaired shaft whose dimensions are restored, but have inadequate material properties on the pressure face of the spline. One of these inadequate properties is an undesirable change in grain size within the heat affected zone (HAZ) of the weld area. The HAZ is the region(s) surrounding a weld that are measurably affected by the welding process. If sufficient heat is transferred into a welded substrate, microstructure grain size can increase. A larger grain size is associated with lower fatigue life and results in a material microstructure that is more susceptible to cracking and will withstand less cyclic stress. Fatigue cracking on the pressure face of splines are a known cause of premature failure.

Accordingly, there is a need for a method of repairing the spline teeth of a power transmission shaft of a gas turbine engine that overcomes the inadequacies of the prior art.

SUMMARY OF THE INVENTION

The present invention is directed to an overlay for use in repairing spline teeth of a mated component. The present invention provides a method of minimizing the alteration of physical properties adjacent a weld repair area, by creating a low heat input through welding a minimal amount of repair material to a surface that opposes the worn area, while providing a full metallurgical bond between the repair material and the substrate.

According to one embodiment of the invention, an overlay for use in repairing one or more radially spaced splines of a mated component is disclosed. The overlay comprises a tube comprising a weld repair material, the tube having an outer surface and an inner surface, wherein the inner surface is dimensioned to define an aperture sized to receive a plurality of radially spaced splines of a component, the splines of the component arranged to matingly engage a complementary component.

According to another embodiment of the invention, an overlay for use in repairing one or more radially spaced splines of an aircraft turbine engine shaft is disclosed. The overlay comprises a tube comprising at least one material selected from the group consisting of nickel, iron and chromium, the tube having an outer surface and an inner surface, wherein the inner surface defines an aperture dimensioned to receive and contact radially spaced splines of an aircraft turbine engine shaft.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

While exemplary embodiments of the invention will be discussed primarily with respect to a power turbine shaft of a gas turbine engine, it will be appreciated that the invention can be used with respect to any mated component having splines or seal teeth that matingly engage a corresponding, complementary mated component.

Figure 1:
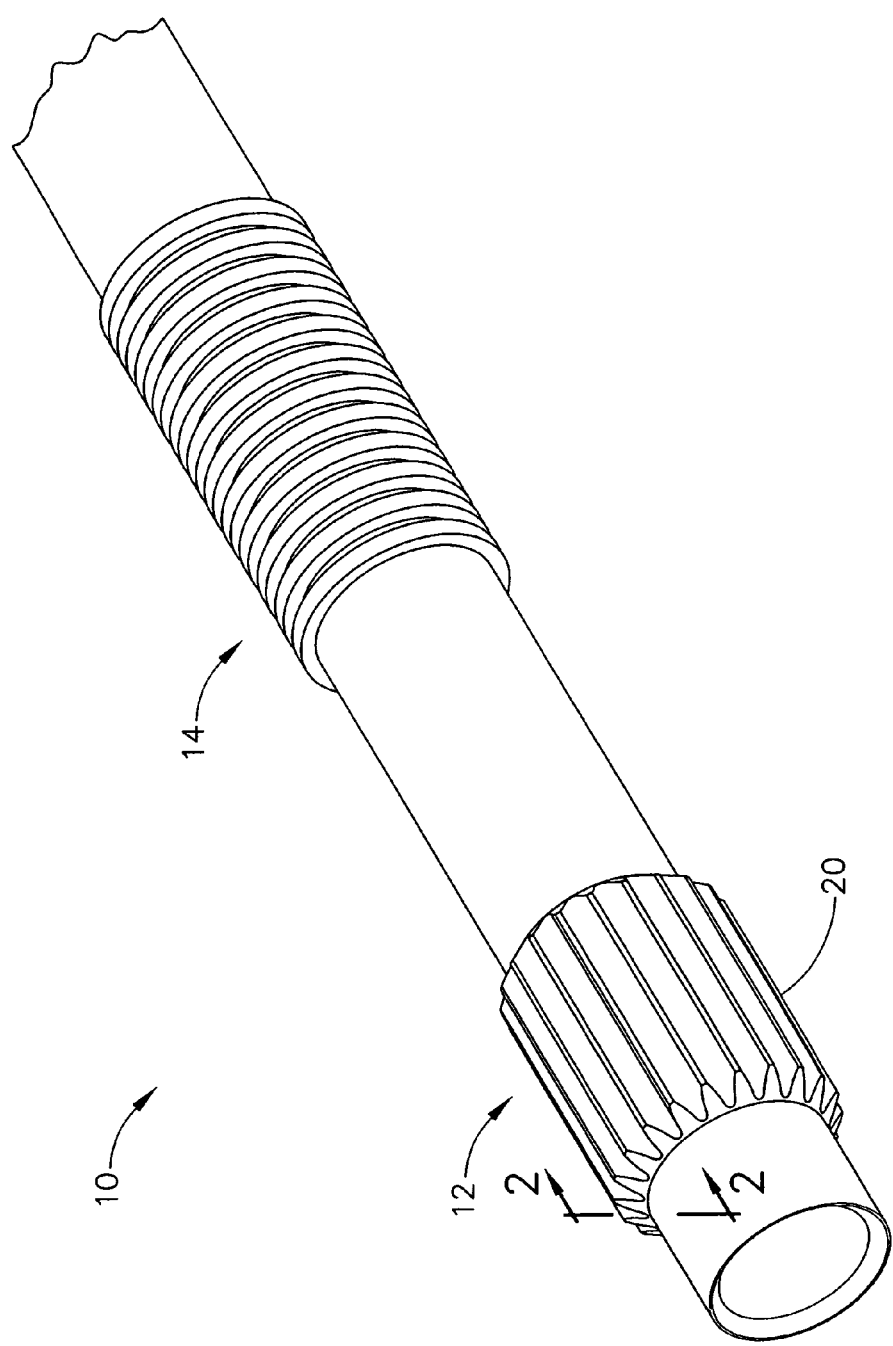
FIG. 1 is a perspective view of a power turbine shaft of an aircraft engine.

FIG. 1 illustrates a power turbine shaft 10 of an aircraft engine (not shown) to include a splined portion 12 and a seal portion 14. Splined portion 12 includes a plurality of splines 20 aligned substantially parallel to the axis of shaft 10 and radially spaced about shaft 10.

Figure 2:
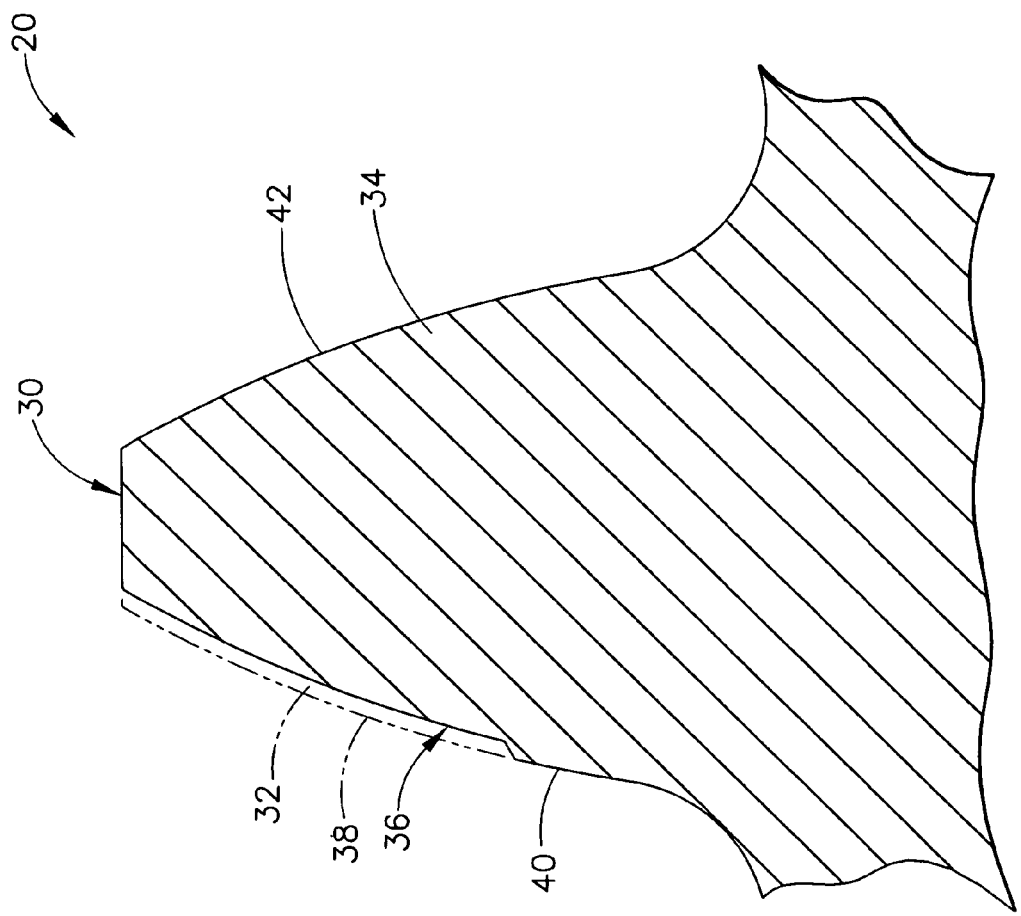
FIG. 2 is an enlarged partial sectional view, taken along the line 2-2 of FIG. 1, with spline wear exaggerated for clarity.

With reference to FIG. 2, a spline 20 is illustrated. Spline 20 has an exterior surface 30 that defines a typical repair area, or worn portion, 32 and a non-worn portion 34. Worn portion 32 is defined by a phantom line 38 and a worn surface 36. Before use within an aircraft engine, spline 20 was manufactured to dimensions defined by phantom line 38 and exterior surface 30. During use, worn portion 32 has been lost by spline 20, so that exterior surface 30 includes worn surface 36. As the exterior surface 30 at phantom line 38 matingly engaged a tooth, or spline, of a complementary device (not shown), torque was transferred between the shaft 10 and the complementary device, resulting in wear and the loss of worn portion 32. As used in this discussion, worn portion 32 is located on the pressure, or contact, face 40 of spline 20. The opposite face of spline 20 is referred to as non-pressure, or non-contact, face 42.

Figure 3:
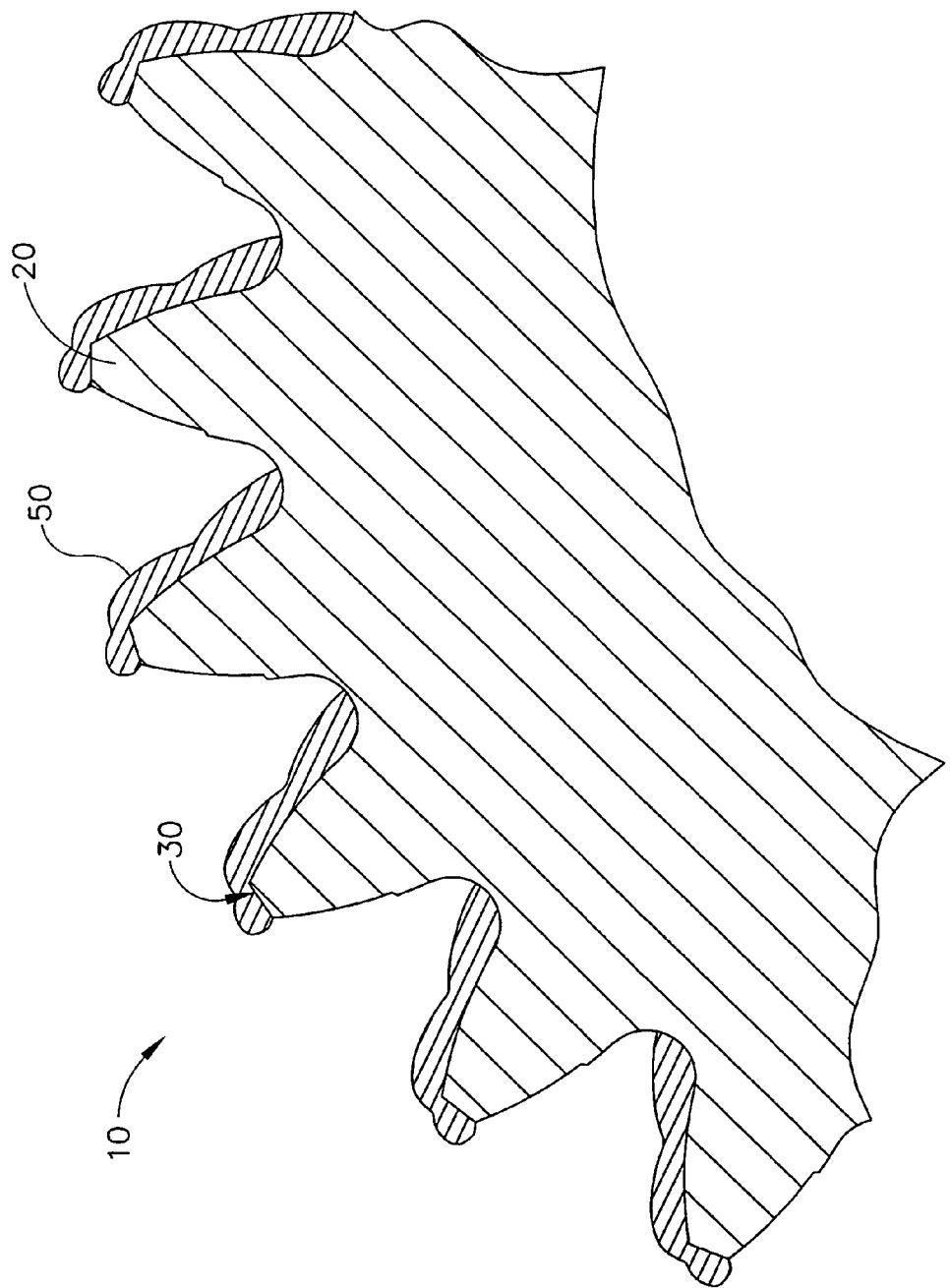
FIG. 3 is a sectional view of a power turbine shaft illustrating a series of the splines of FIG. 2 in which the thickness of welded repair material is exaggerated for clarity.

FIG. 3 is a portion of the shaft 10 which illustrates a series of splines 20 with repair material 50 attached thereto. Preferably, repair material 50 is welded to the spline 20 using a focused energy, or low heat, input welding process. Even more preferably, the weld puddle created is approximately 39.4 mils (~1 mm) in diameter. Exemplary welding processes are pulsed plasma arc, micro plasma arc, pulsed laser, and pulsed electron beam. The micro plasma arc is preferably applied at welding currents between about 0.1 and 15 amps. In this manner, repair material 50 can be welded to the spline 20 with a minimum of heat input into spline 20 to reduce the HAZ. If a wire feed is used, the wire is preferably less than about 39.4 mils (~1 mm) in diameter. It will be appreciated that welding repair material 50 onto spline 20 could be accomplished with a manual or automated process, or a combination of the two. When using a pulsed electron beam weld, the welding process is typically accomplished with a voltage of about 100-140 kV and an amperage of about 5 to 10 mA. The pass rate is typically about 10-20 inches per minute. It will be appreciated that any technique or combination of techniques can be used, so long as the heat input is controlled to prevent excessive grain growth in the HAZ. Excessive grain growth as used herein is an increase in grain size that adversely affects the material properties of the spline, preventing re-use of the spline.

Thus provided, repair material 50 is bonded to spline 20 while reducing the HAZ adjacent the weld. In the embodiment provided, the HAZ grain size can be within a desired range of less than ASTM Number 10, as determined by ASTM E112-96e2, Standard Test Methods for Determining Average Grain Size. Grain sizes larger than a desired value are generally associated with promoting the propagation of fatigue cracks, which can lead to component failure.

Splines 20 are thin, narrow projections on shaft 10, and as such, it is desirable to maintain the heat input as low as reasonably possible to reduce the effect of the HAZ on the pressure face 40 of each spline 20. If the heat input were not controlled, HAZ and grain growth may extend from the non-pressure face 42 through the spline 20 to the pressure face 40, thereby negating the effectiveness of a repair. Thus, even though some grain growth may occur, the low heat input limits the effects of the repair to the non-pressure face 42, which typically is not in contact with any other component during normal operation and thus the HAZ and grain growth if properly controlled and limited to the non-pressure face 42 will not be a significant factor in fatigue.

Figure 4:
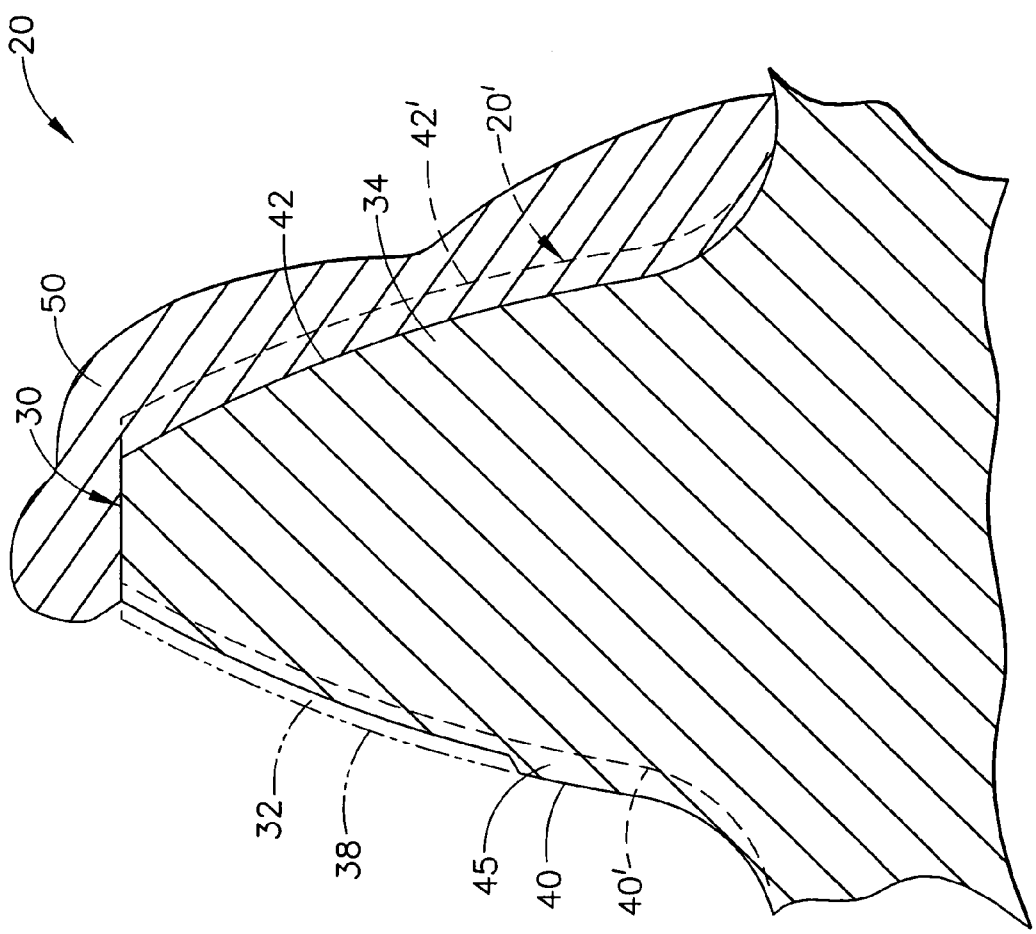
FIG. 4 is an enlarged partial sectional view similar to FIG. 2, illustrating an exemplary contour of a spline to which repair material has been attached in accordance with the present invention.

As best seen in FIG. 4, repair material 50 is attached to the spline in a manner that results in a build-up of repair material 50 on the non-pressure face 42. FIG. 4 further illustrates in phantom the contour of a repaired spline 20' which includes a repaired pressure face 40' and a repaired non-pressure face 42'. As will be appreciated, after the addition of repair material 50, shaft 10 is remachined, or cut, creating a repaired spline 20'.

Figure 5:
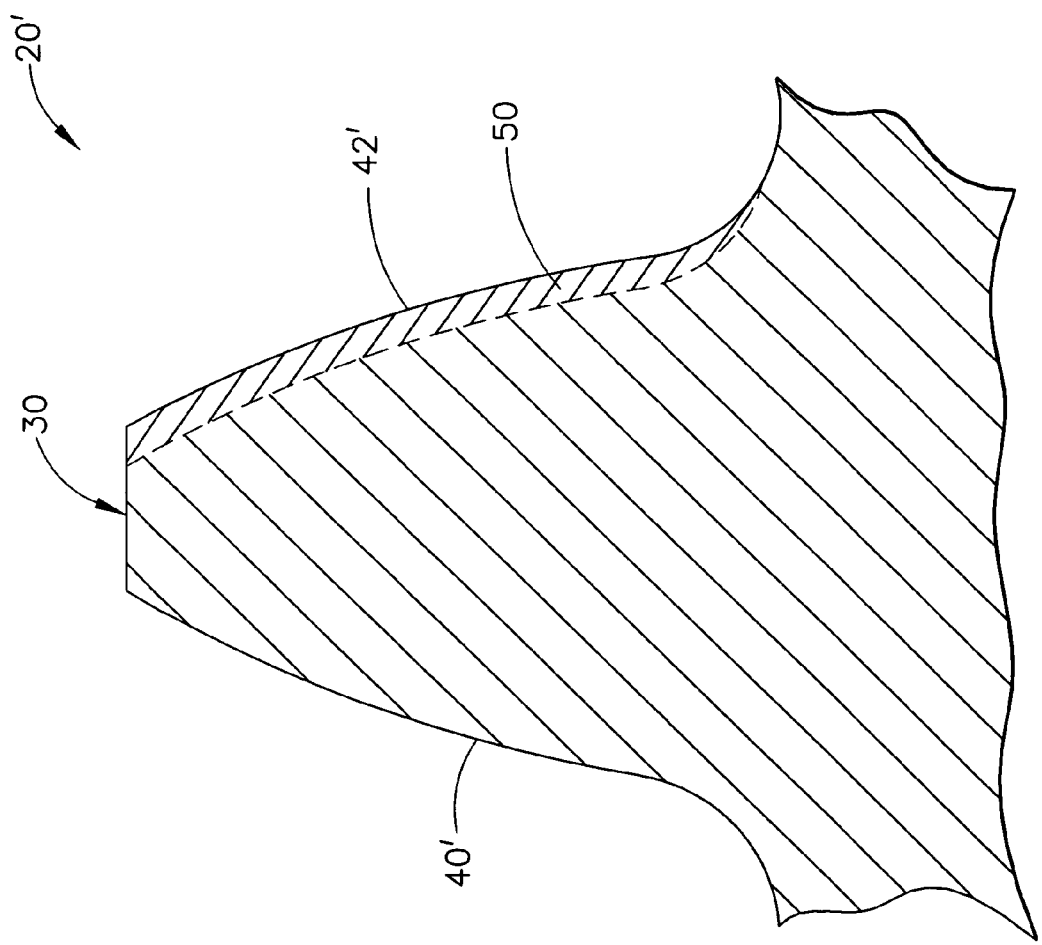
FIG. 5 is an enlarged partial sectional view similar to FIG. 2, illustrating an exemplary contour after remachining of a spline in accordance with an embodiment of the present invention.

In a preferred embodiment, the method of the present invention includes identifying a repair area 45 on pressure face 40 of spline 20, welding repair material 50 to non-pressure faces 42, and machining shaft 10 to produce repaired spline 20'. The repair area 45 is defined by the area of spline 20 to be machined to provide a repaired pressure face 40'. As will be appreciated, to maintain symmetry and balance during operation, all splines 20 of shaft 10 will typically require a build up of repair material 50 onto the non-pressure faces 42 to provide repaired splines 20'. The pressure face 40 of each spline 20 is machined to the contour of repaired pressure face 40'. The non-pressure face 42 is preferably also machined to remove excess repair material 50 to produce repaired non-pressure face 42'. Thus provided, repaired splines 20' are slightly reclocked on shaft 10 when compared to the original radial locations of splines 20, but otherwise the repaired splines 20' have dimensions that are the same or nearly the same as the original splines 20 and within fit-up tolerances. FIG. 5 illustrates a repaired spline 20' after completion of machining operations.

Thus provided, remachined pressure face 40' of spline 20' is comprised of original forged shaft material and not of repair material 50. In this manner, shaft 10 is provided with a wear surface that comprises the original shaft materials. This original material retains the desired physical properties for splines 20 and, in using the method described herein, has not been significantly altered by the welding process. In contrast, a repair consisting of applying a repair material to worn portion and remachining a shaft to original dimensions would provide a shaft with contacting surfaces that may have undesirable properties. It will be appreciated that the process described herein, while preferably directed to repairing splines 20 that have been worn due to normal use, could also be used, for example, to repair splines 20 that do not conform to required tolerances for whatever reason.

Repair material 50 is typically built up on non-pressure face 42 to a thickness of less than about 40 mils, preferably less than about 15 mils. The repair material may be applied in a plurality of passes, in order to minimize heat input on any one pass. It will be appreciated that the build-up of repair material 50 is at least as thick as the worn portion 32 in order to restore the repaired spline 20' to the same dimensions as the spline 20 prior to use and its subsequent wear. Thus, prior to the build-up of repair material, the thickness of the worn portion 32, and thus the thickness of the repair area of the pressure face 40, is typically determined normal to the worn surface 36.

Also preferred, repair material 50 is of identical material as shaft 10, which materials are typically superalloys selected from the group consisting of nickel-based, iron-based, cobalt-based, and combinations thereof. Even more preferably, shaft 10 and repair material 50 are INCONEL® 718, although other suitable materials could be repaired using the method described herein. INCONEL® is a federally registered trademark owned by Huntington Alloys Corporation of Huntington, W. Va. The composition of INCONEL® 718 is well known in the art and is a designation for a nickel-based superalloy comprising about 18 weight percent chromium, about 19 weight percent iron, about 5 weight percent niobium+tantalum, about 3 weight percent molybdenum, about 0.9 weight percent titanium, about 0.5 weight percent aluminum, about 0.05 weight percent carbon, about 0.009 weight percent boron, a maximum of about 1 weight percent cobalt, a maximum of about 0.35 weight percent manganese, a maximum of about 0.35 weight percent silicon, a maximum of about 0.1 weight percent copper, and the balance nickel.

By welding the repair material 50 to the non-pressure face 42 of a spline 20, the HAZ of the repaired spline will be adjacent the repaired non-pressure face 42' of repaired spline 20'. The grain size within this HAZ may be larger than the grain size of original shaft 10 material adjacent pressure face 40'. For applications involving a spline that encounters a single rotational direction, and therefore a pressure face and a non-pressure face on each spline, alteration of the physical properties, such as hardness and grain size, adjacent the pressure face may impact the strength and service life of the component, while alteration of physical properties adjacent the non-pressure face may have negligible impact on the strength and service life of the component. Further heat treatment to alter the physical properties of a shaft, if desired, may be performed and is envisioned as a part of the subject invention. Heat treatment is typically carried out at a temperature between about 1150° F. to about 1400° F. for up to about 16 hours using standard ramp rates for the material selected to reach the treatment temperature.

The use of wire feed welding methods may be used to repair splines in accordance with exemplary embodiments of the invention. While satisfactory results are achieved with wire feed welding, to achieve a level of consistency and repeatability in a production environment, yet another exemplary embodiment of the invention is provided.

According to another embodiment of the invention, a method for repairing the splines involves the use of a sheath or overlay that fits over the splines of the gas turbine shaft. The overlay covers and contacts the splines and acts as a sacrificial source of repair material for welding. The use of an overlay provides better control over the amount of repair material applied to the splines and thus provides better heat control during welding.

Figure 6:
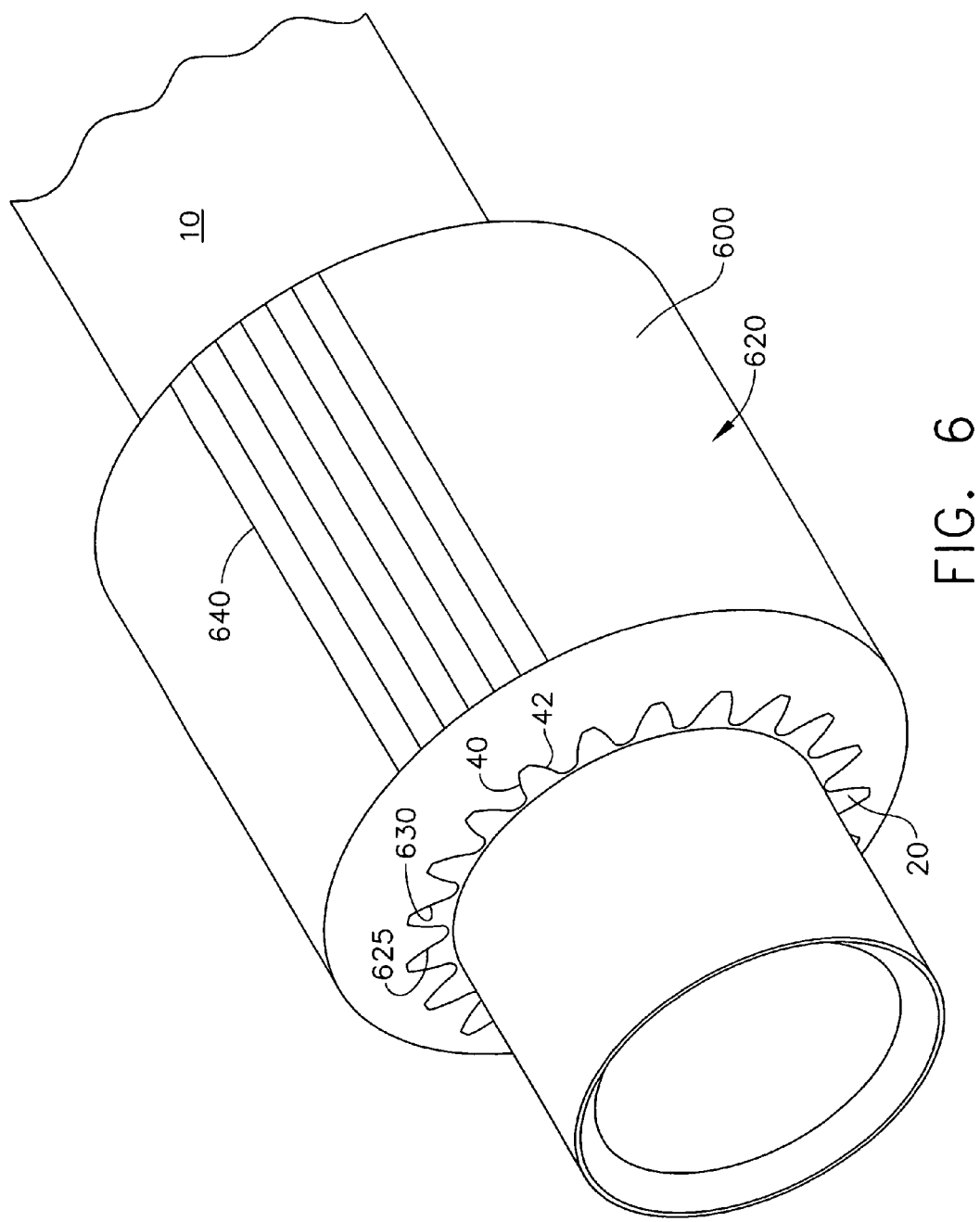
FIG. 6 is a perspective view of the spline portion of the shaft of FIG. 1 having an overlay applied over the splines according to an embodiment of the invention.

Referring to FIG. 6, an overlay 600 is a tubular device comprised of any weld repair material, and preferably is INCONEL® 718. The overlay 600 has an outer surface 620 and an inner surface 625 that defines an aperture 630 through which the splines 20 fit. The inner surface 625 is dimensioned to substantially match the geometry and dimensions of the splines 20 so that when the overlay 600 is placed over the splines 20 of the shaft 10, the overlay 600 is substantially immobilized by a slip fit with the splines 20 which are received by matching recesses formed along the inner surface 625 of the overlay 600.

Figure 7:
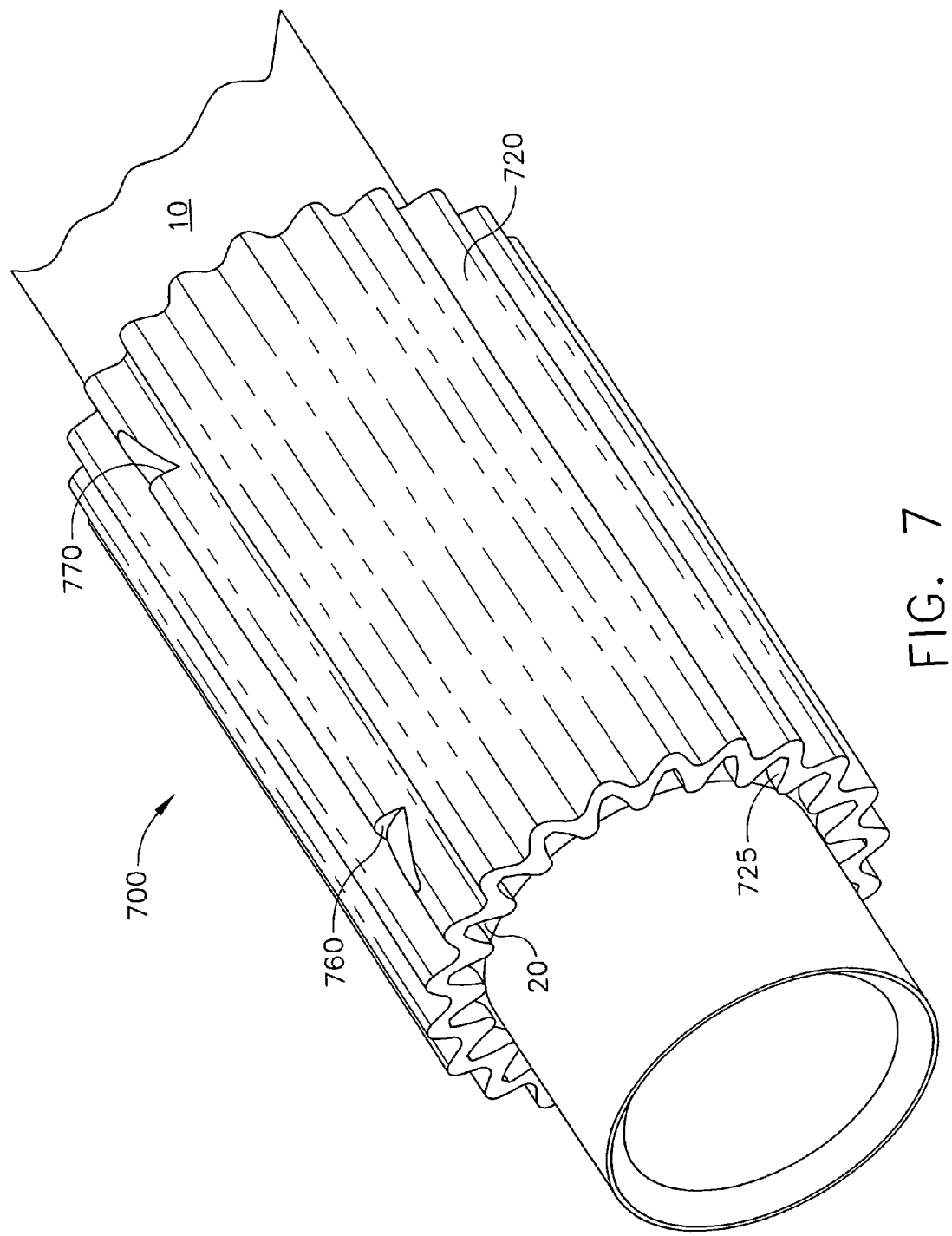
FIG. 7 is a perspective view of the spline portion of the shaft of FIG. 1 having an overlay applied over the splines according to another embodiment of the invention.

The outer surface 620 of the overlay 600 may be defined by any cross-sectional area. For example, the outer surface 620 may be defined by a circular cross sectional area as shown in FIG. 6, while according to another exemplary embodiment of the invention, a cookie-cutter style overlay 700 as shown in FIG. 7 is used. As illustrated in FIG. 7, the overlay 700 has a substantially uniform thickness, decreasing the amount of material needed to construct the overlay 700, in which both an outer surface 720 and an inner surface 725 of the overlay 700 substantially match the contour of the splines 20.

Referring again to FIG. 6, the overlay 600 may have a series of parallel scribes lines 640 running along the length of the overlay 600. The scribe lines 640 can be made using any method known in the art and are spaced on the outer surface 620 of the overlay 600 such that the scribe lines 640 define alternating areas over the pressure face 40 and non-pressure face 42 of the splines 20. Using a precision welding device, a series of weld passes are made in the area between two scribe lines 640, which area is over a non-pressure face of a spline 20. Preferably, the welds are made in a direction parallel to the scribe lines. The weld causes a portion of the overlay 600 to be metallurgically bonded as repair material to the non-pressure face 42 of the splines 20.

Once the area between the scribe lines 640 has been completely welded, the process is repeated with respect to the next set of scribe lines 640 that define an area over a non-pressure face 42 of a spline 20, skipping every other area defined by the scribe lines 640, which define an area over a pressure face 40 of a spline 20 for which it is not desired to attach any repair material. When the overlay 600 has an outer surface defined by a circular cross-sectional area as shown in FIG. 6, the distance from the outer surface 620 to the non-pressure face 42 of the spline 20, and the depth of the weld, changes with each pass. Using precision welding tools as are known to those of skill in the art, adjustments can be easily made after each pass to control the depth of the weld for the subsequent pass. The overlay 600 is of a sufficient thickness to allow heat from the weld to heat the inner surface 625 of the overlay 600 and thus result in the deposition of repair material on the non-pressure face 42 of the splines.

The overlay 600 can be of any length, but is preferably at least as long as the splines 20 of the shaft 10 to avoid the need to use more than one overlay 600, and to permit a single, uninterrupted path along the length of each spline 20. Preferably, as shown in FIG. 7, the overlay 700 is longer than the splines 20. It will be appreciated that the lengths of the overlay shown in FIGS. 6 and 7 are for purposes of illustration and are not dependent on the shape of the overlay.

As will be appreciated, heat surge and the like are known to sometimes occur at points of weld initiation or termination. Thus, if a weld is started or stopped directly over the spline 20 being repaired, variations of quality may occur in the weld resulting in localized areas having undesirable properties. However, if the weld is initiated or stopped beyond the splines 20, a consistent weld can be achieved over the entire length of the splines 20 and any heat surge occurs at an area of the overlay 700 not in contact with the splines 20.

However, because the overlay 700 extends beyond the splines 20, the splines 20 cannot be seen during the welding process. Accordingly, start and stop tabs 760, 770 may be provided that serve as markers on the outer surface 720 of points before and after the splines 20. The tabs 760, 770 indicate that welding can be initiated or stopped with little risk of heat surge or other damage to the splines 20. It will be appreciated that the start and stop tabs 760, 770 may be used in combination with scribe lines to define an area for welding, although scribe lines may be unnecessary when using an overlay 700 having a substantially constant thickness as illustrated in FIG. 7, in which the peaks and valleys of the contoured outer surface 720 perform the same function as scribe lines.

Precision welding tools as are known in the art may be used to accomplish the various welding processes of the invention using an overlay. In this manner, the width and depth of a weld run can be controlled so that the weld does not result in repair material from the overlay being applied to the pressure face of any spline. Furthermore, a consistent amount of repair material is applied to the splines. After welding is complete, those portions of the overlay not attached by the weld, i.e., those portions contacting the pressure face of the splines, are easily removed during machining operations. As previously discussed, machining involves machining the pressure face of the spline to provide a smooth surface comprised of as-manufactured shaft material. The non-pressure face is also machined to remove excess repair material where the overlay was welded to provide the desired contour and dimensions of the spline.

It will be appreciated that while exemplary embodiments of the invention have been described with respect to splines of a gas turbine engine shaft, the principles of the invention apply equally to seal teeth and any other component of a gas turbine engine having splines, teeth, sprockets, or similar features.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for use in repairing one or more equally and radially spaced splines of an aircraft turbine engine shaft, the apparatus comprising:

a tubular overlay comprising a nickel-based superalloy, the tubular overlay having an outer surface and a substantially cylindrical inner surface, the substantially cylindrical inner surface having a plurality of equally and radially-spaced spline-receiving grooves conforming to a plurality of equally and radially spaced splines of an aircraft turbine engine shaft, each of the equally and radially-spaced spline-receiving grooves being substantially parallel to the major axis of the substantially cylindrical inner surface, the tubular overlay further having a plurality of tabs extending from the outer surface.

2. The apparatus of claim 1, wherein the tubular overlay has a substantially constant thickness.

3. The apparatus of claim 1, wherein the cross-sectional area of the outer surface of the tubular overlay is circular.

4. The apparatus of claim 1, further comprising scribe lines on the outer surface of the tubular overlay.

5. The apparatus of claim 4, wherein the scribe lines are substantially parallel to the major axis of the substantially cylindrical inner surface.

6. The apparatus of claim 1, wherein the tubular overlay comprises a nickel-based superalloy comprising about 18 weight percent chromium, about 19 weight percent iron, about 5 weight percent niobium+tantalum, about 3 weight percent molybdenum, about 0.9 weight percent titanium, about 0.5 weight percent aluminum, about 0.05 weight percent carbon, about 0.009 weight percent boron, a maximum of about 1 weight percent cobalt, a maximum of about 0.35 weight percent manganese, a maximum of about 0.35 weight percent silicon, a maximum of about 0.1 weight percent copper, and the balance nickel.

7. An apparatus for use in repairing one or more equally and radially spaced splines of an aircraft turbine engine shaft, the apparatus comprising:

a tubular overlay comprising a nickel-based superalloy, the tubular overlay having an outer surface and a substantially cylindrical inner surface, the substantially cylindrical inner surface having a plurality of equally and radially-spaced spline-receiving grooves conforming to a plurality of equally and radially spaced splines of an aircraft turbine engine shaft, each of the equally and radially-spaced spline-receiving grooves being substantially parallel to the major axis of the substantially cylindrical inner surface, the outer surface having scribe lines.

8. The apparatus of claim 7, wherein the scribe lines are substantially parallel to the major axis of the substantially cylindrical inner surface.

* * * * *